United States Patent
Koc et al.

(10) Patent No.: US 9,515,757 B2
(45) Date of Patent: Dec. 6, 2016

(54) SYSTEMS AND METHODS FOR ENHANCED USER EQUIPMENT ASSISTANCE INFORMATION IN WIRELESS COMMUNICATION SYSTEMS

(71) Applicant: Intel Corporation, Santa Clara, CA (US)

(72) Inventors: Ali T. Koc, Hillsboro, OR (US); Marta Martinez Tarradell, Hillsboro, OR (US); Sangeetha L. Bangolae, Beaverton, OR (US); Satish C. Jha, Hillsboro, OR (US); Rath Vannithamby, Portland, OR (US); Jing Zhu, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 509 days.

(21) Appl. No.: 13/719,362

(22) Filed: Dec. 19, 2012

(65) Prior Publication Data
US 2013/0301500 A1 Nov. 14, 2013

Related U.S. Application Data

(60) Provisional application No. 61/646,223, filed on May 11, 2012.

(51) Int. Cl.
*H04W 56/00* (2009.01)
*H04J 3/16* (2006.01)
(Continued)

(52) U.S. Cl.
CPC ............ *H04J 3/1694* (2013.01); *H04B 1/56* (2013.01); *H04B 7/024* (2013.01); *H04B 7/0456* (2013.01);
(Continued)

(58) Field of Classification Search
CPC ...... H04W 56/00; H04W 16/14; H04W 24/10; H04W 76/048; H04B 7/0473; H04B 7/0486
See application file for complete search history.

(56) References Cited

U.S. PATENT DOCUMENTS

| | | | | |
|---|---|---|---|---|
| 7,966,017 B2 * | 6/2011 | Kim | ...................... | H04W 36/08 370/328 |
| 8,289,891 B2 * | 10/2012 | Ji et al. | ......................... | 370/311 |
| 8,325,680 B2 * | 12/2012 | Muhanna | .......... | H04W 36/0016 370/331 |

(Continued)

FOREIGN PATENT DOCUMENTS

| | | |
|---|---|---|
| KR | 1020040061705 A | 7/2004 |
| KR | 10-2011-0036518 A | 4/2011 |
| KR | 1020100126815 A | 10/2013 |

OTHER PUBLICATIONS

International Search Report and Written Opinion received for PCT Application No. PCT/US2013/040675, mailed on Aug. 22, 2013, 10 Pages.

(Continued)

*Primary Examiner* — Chandrahas Patel
*Assistant Examiner* — Lan Huong Truong
(74) *Attorney, Agent, or Firm* — Stoel Rives LLP (57) ABSTRACT

Systems and methods are disclosed for communicating enhanced user equipment (UE) assistance information between nodes in wireless communication systems. The UE achieves power savings and latency requirements more effectively by communicating its preferences, constraints and/or requirements to an evolved Node B (eNodeB) in the form of UE assistance information. The UE assistance information may include, for example, an indication of a preferred set of discontinuous reception (DRX) settings, current data traffic conditions, expected data traffic condi- (Continued)

tions, power or performance preferences, and/or an indication of the UE's mobility between cells.

4 Claims, 7 Drawing Sheets

(51) Int. Cl.
| | |
|---|---|
| H04B 7/26 | (2006.01) |
| H04W 36/00 | (2009.01) |
| H04W 24/10 | (2009.01) |
| H04W 72/04 | (2009.01) |
| H04W 72/08 | (2009.01) |
| H04J 3/00 | (2006.01) |
| H04B 1/56 | (2006.01) |
| H04W 52/02 | (2009.01) |
| H04W 76/02 | (2009.01) |
| H04W 4/22 | (2009.01) |
| H04W 36/22 | (2009.01) |
| H04B 15/00 | (2006.01) |
| H04W 76/04 | (2009.01) |
| H04B 7/02 | (2006.01) |
| H04B 7/04 | (2006.01) |
| H04B 7/06 | (2006.01) |
| H04W 24/02 | (2009.01) |
| H04W 72/12 | (2009.01) |
| H04L 29/02 | (2006.01) |
| H04W 4/00 | (2009.01) |
| H04W 4/06 | (2009.01) |
| H04W 48/20 | (2009.01) |
| H04W 16/14 | (2009.01) |
| H04L 29/06 | (2006.01) |
| H04W 4/02 | (2009.01) |
| H04J 3/26 | (2006.01) |
| H04L 27/26 | (2006.01) |
| H04W 72/10 | (2009.01) |
| H04L 5/00 | (2006.01) |
| H04L 5/14 | (2006.01) |
| H04W 36/32 | (2009.01) |
| H04W 4/16 | (2009.01) |
| H04W 36/04 | (2009.01) |
| H04W 36/16 | (2009.01) |
| H04W 72/00 | (2009.01) |
| H04W 36/30 | (2009.01) |
| H04W 36/18 | (2009.01) |
| H04W 88/06 | (2009.01) |
| H04W 72/02 | (2009.01) |
| H04L 1/00 | (2006.01) |
| H04L 1/18 | (2006.01) |
| H04W 88/02 | (2009.01) |
| H04W 88/08 | (2009.01) |

(52) U.S. Cl.
CPC .......... *H04B 7/0473* (2013.01); *H04B 7/0486* (2013.01); *H04B 7/063* (2013.01); *H04B 7/065* (2013.01); *H04B 7/0626* (2013.01); *H04B 7/0632* (2013.01); *H04B 7/0639* (2013.01); *H04B 7/0647* (2013.01); *H04B 7/26* (2013.01); *H04B 15/00* (2013.01); *H04J 3/00* (2013.01); *H04J 3/26* (2013.01); *H04L 5/001* (2013.01); *H04L 5/0007* (2013.01); *H04L 5/0035* (2013.01); *H04L 5/0096* (2013.01); *H04L 5/1469* (2013.01); *H04L 27/2627* (2013.01); *H04L 29/02* (2013.01); *H04L 69/22* (2013.01); *H04W 4/005* (2013.01); *H04W 4/023* (2013.01); *H04W 4/06* (2013.01); *H04W 4/16* (2013.01); *H04W 4/22* (2013.01); *H04W 16/14* (2013.01); *H04W 24/02* (2013.01); *H04W 24/10* (2013.01); *H04W 36/00* (2013.01); *H04W 36/0061* (2013.01); *H04W 36/0088* (2013.01); *H04W 36/04* (2013.01); *H04W 36/16* (2013.01); *H04W 36/22* (2013.01); *H04W 36/32* (2013.01); *H04W 48/20* (2013.01); *H04W 52/0212* (2013.01); *H04W 52/0216* (2013.01); *H04W 52/0225* (2013.01); *H04W 52/0229* (2013.01); *H04W 52/0235* (2013.01); *H04W 52/0251* (2013.01); *H04W 56/00* (2013.01); *H04W 56/001* (2013.01); *H04W 72/005* (2013.01); *H04W 72/042* (2013.01); *H04W 72/044* (2013.01); *H04W 72/0413* (2013.01); *H04W 72/0426* (2013.01); *H04W 72/082* (2013.01); *H04W 72/085* (2013.01); *H04W 72/10* (2013.01); *H04W 72/12* (2013.01); *H04W 72/1215* (2013.01); *H04W 76/023* (2013.01); *H04W 76/027* (2013.01); *H04W 76/046* (2013.01); *H04W 76/048* (2013.01); *H04L 1/0026* (2013.01); *H04L 1/1803* (2013.01); *H04L 1/1822* (2013.01); *H04L 5/0053* (2013.01); *H04L 5/0073* (2013.01); *H04L 5/14* (2013.01); *H04W 36/18* (2013.01); *H04W 36/30* (2013.01); *H04W 72/02* (2013.01); *H04W 72/1226* (2013.01); *H04W 88/02* (2013.01); *H04W 88/06* (2013.01); *H04W 88/08* (2013.01); *Y02B 60/50* (2013.01)

(56) References Cited

U.S. PATENT DOCUMENTS

| | | | | |
|---|---|---|---|---|
| 8,358,364 | B2* | 1/2013 | Saito | G08C 17/00 341/173 |
| 8,626,167 | B2* | 1/2014 | Futaki | H04W 36/0055 455/436 |
| 8,843,172 | B2* | 9/2014 | He | H04W 52/50 455/452.1 |
| 2008/0167089 | A1* | 7/2008 | Suzuki | H04L 1/1829 455/574 |
| 2008/0232310 | A1* | 9/2008 | Xu | H04W 52/0216 370/329 |
| 2009/0067386 | A1* | 3/2009 | Kitazoe | H04J 11/0069 370/332 |
| 2009/0239539 | A1 | 9/2009 | Zhang | |
| 2010/0074188 | A1* | 3/2010 | Hsu | H04W 56/00 370/329 |
| 2010/0074202 | A1* | 3/2010 | Park | H04W 56/004 370/329 |
| 2010/0184443 | A1 | 7/2010 | Xu | |
| 2011/0212742 | A1 | 9/2011 | Chen et al. | |
| 2011/0310782 | A1* | 12/2011 | Kim | H04W 52/0216 370/311 |
| 2012/0120843 | A1* | 5/2012 | Anderson | H04W 52/0232 370/253 |
| 2012/0207070 | A1* | 8/2012 | Xu | H04W 48/20 370/311 |
| 2012/0213137 | A1* | 8/2012 | Jeong | H04W 52/0212 370/311 |
| 2012/0218922 | A1* | 8/2012 | Klingenbrunn | H04L 5/0053 370/280 |

OTHER PUBLICATIONS

Ericsson, "DRX in Connected mode", TSG-RAN Working Group 2 (Radio layer 2 and Radio layer 3). TSGR2#7(99) A93, Malmo, Sweden, Sep. 20-24, 1999, 7 Pages.

(56) References Cited

OTHER PUBLICATIONS

QUALCOMM Europe, "E-MBMS scheduling", 3GPP TSG-RAN WG2 #56bis, R2-070237 Sorrento, Italy, Jan. 15-19, 2007, 4 Pages.

Intel Corporation, "Evaluation of UE Power Consumption and Latency using DRX Parameters Switching", R2-121747, 3GPP TSG RAN WG2, Meeting #77bis, Agenda Item 72.1, Jeju, Korea, Mar. 26-Mar. 30, 2012, 8 pages.

Research in Motion UK Limited, "A Framework for Management of Background Traffic UEs", R2-121609, 3GPP TSG-RAN WG2 Meeting #77bis, Agenda Item 7.2.1, Jeju, South Korea, Mar. 26-Mar. 30, 2012, 4 pages.

Samsung, "Assistance Information from UE to eNB for eDDA", R2-121465, 3GPP TSG-RAN WG2 #77Bis, Agenda Item 7.2.2, Jeju, Korea, Mar. 26-Mar. 30, 2012, 4 pages.

Catt, "Evaluation on DRX and Dormancy Timer for Background Traffic and IM Traffic", R2-121855, 3GPP TSG RAN WG2 Meeting #77bis, Jeju, Korea, Mar. 26-30, 2012, 10 pages.

HT Mmobile Inc., "TA group change for SCell", R2-115199, 3GPP TSG RAN WG2 Meeting #75bis, Zhuhai, China, Oct. 10-14, 2011, 5 pages.

Intel Corporation, "Evaluation of UE Power Consumption and Latency using DRX Parameters Switching", R2-121747, 3GPP TSG RAN WG2 Meeting #77bis, Jeju, Korea, Mar. 26-30, 2012, 9 pages.

Intel Corporation, "Support for UE Assistance Information for eDDA", R2-121746, 3GPP TSG RAN WG2 Meeting #77bis, Jeju, Korea, Mar. 26-30, 2012, 5 pages.

Nokia Corporation, "UE assistance information for UE power saving and optimized network performance", R2-121203, 3GPP TSG-RAN WG2 Meeting #77bis, Jeju, Korea, Mar. 26-30, 2012, 5 pages.

Qualcomm Incorporated, "Change Request—Rel-10 FDD-TDD Capability Split", R2-121394, 3GPP TSG-RAN2 Meeting #77bis, Jeju, Korea, Mar. 26-30, 2012, 14 pages.

Research in Motion UK Limited, "A Framework for Management of Background Traffic UEs", R2-121609, 3GPP TSG-RAN WG2 Meeting #77bis, Jeju, South Korea, Mar. 26-30, 2015, 5 pages.

Zte, "DRX enhancements for power saving", R2-121257, 3GPP TSG-RAN WG2 Meeting #77bis, Jeju, South Korea, Mar. 26-30, 2012, 4 pages.

* cited by examiner

UE Assistance Information

FIG. 3A

| Traffic Type | Type ID | Description |
|---|---|---|
| Bursty/Infrequent | 00 | Report average short and long IATs |
| Regular | 01 | Report minimum and maximum IATs |
| Regular | 10 | Report mean and maximum IATs |
| Regular | 11 | Reserved or report other statistical formats |

SYSTEMS AND METHODS FOR ENHANCED USER EQUIPMENT ASSISTANCE INFORMATION IN WIRELESS COMMUNICATION SYSTEMS

RELATED APPLICATION

This application claims the benefit under 35 U.S.C. §119(e) of U.S. Provisional Application No. 61/646,223, filed May 11, 2012, which is hereby incorporated by reference herein in its entirety.

TECHNICAL FIELD

This disclosure relates to wireless communication networks. Specifically, this disclosure relates to systems and methods for communicating enhanced user equipment assistance information between nodes in wireless communication systems.

BACKGROUND

Wireless mobile communication technology uses various standards and protocols to transmit data between a base station and a wireless mobile device. Wireless communication system standards and protocols can include the third generation partnership project (3GPP) long term evolution (LTE), the Institute of Electrical and Electronics Engineers (IEEE) 802.16 standard, which is commonly known to industry groups as WiMAX (Worldwide interoperability for Microwave Access), and the IEEE 802.11 standard, which is commonly known to industry groups as WiFi. In 3GPP radio access networks (RANs) in LTE systems, the base station can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs) in an E-UTRAN, which communicates with the wireless mobile device, known as a user equipment (UE). A downlink (DL) transmission can be a communication from the base station (or eNodeB) to the wireless mobile device (or UE), and an uplink (UL) transmission can be a communication from the wireless mobile device to the base station.

In many wireless systems, including previous LTE systems, UEs have little or no control over certain functions and processes that prolong the UE's battery and/or achieve better performance (e.g., in terms of latency) for applications running on the UE. Rather, many such functions and processes are determined by the eNodeB without input from the UE.

DETAILED DESCRIPTION

A detailed description of systems and methods consistent with embodiments of the present disclosure is provided below. While several embodiments are described, it should be understood that disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As discussed above, UEs have little or no control over certain functions and processes that prolong the UE's battery and/or minimize latency for applications running on the UE. For example, a base station, such as an eNodeB, controls the RAN functions to support the UE. However, due to the proliferation of smartphones and other mobile devices that run diverse mobile internet applications, the UE can achieve power savings and latency requirements more effectively if it is allowed to communicate its preferences, constraints and/or requirements to the eNodeB in the form of UE assistance information.

Figure 1:
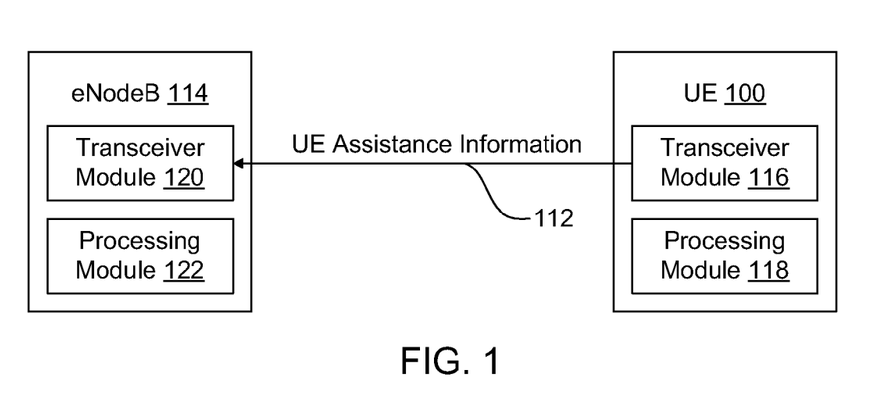
FIG. 1 illustrates an example of a UE communicating UE assistance information to an eNodeB according to one embodiment.

FIG. 1 illustrates an example of a UE 100 communicating UE assistance information 112 to an eNodeB 114 according to one embodiment. The UE 100 includes a transceiver module 116 and a processing module 118. The processing module 118 is configured to generate the UE assistance information 112 and perform other functions of the UE 100 as described herein. The transceiver module 116 is configured to transmit the UE assistance information 112 to the eNodeB 114 and to transmit and receive other signals and messages as described herein. The eNodeB 114 includes a transceiver module 120 and a processing module 122. The transceiver module 120 is configured to receive the UE assistance information 112 from the UE 100 and to transmit and receive other signals and messages as described herein. The processing module 122 is configured to process the UE assistance information 112 received from the UE 100 and to perform other functions described herein.

The eNodeB 114 can use the UE assistance information 112 to adopt certain RAN functions and parameters to enhance the UE's and network's performance. For example, the UE assistance information 112 may be useful to the eNodeB 114 in selecting optimal discontinuous reception (DRX) settings in order to achieve improved power savings at the UE 100.

Certain embodiments disclosed herein provide enhancements to the UE assistance information 112 that enable the eNodeB 114 to adjust the DRX parameters per UE 100 based on UE indications (e.g., the packet inter arrival time and/or traffic type characteristics) to achieve desired performance requirements and/or to save power. For example, the UE assistance information 112 according to certain embodiments may include a packet inter-arrival time (IAT), a mobility state indicator (MSI), a data and/or traffic type characteristic, a timer alignment timer (TAT) feedback value, and combinations of the foregoing. Each of these different types of UE assistance information 112 is discussed in detail below. Skilled persons will recognize from the disclosure herein that other embodiments may use UE assistance information 112 having additional or different elements such as other DRX parameters or parameter sets, battery constraint indicators, quality of experience (QoE) metrics, and/or a request to go to idle mode. After discussing the examples of UE assistance information, examples for signaling the UE assistance information an example UE are provided.

I. Examples of UE Assistance Information

A. Packet IAT

In one embodiment, the UE assistance information 112 includes data associated with UL packet IAT at the UE 100. The packet IAT is a measurement of the time period between packet arrivals at the UE 100 and may correspond to the types of applications currently running on the UE 100. The UE 100 may measure the packet IAT, but the eNodeB 114 does not know the packet IAT of the UL packets at the UE 100. It is possible for the eNodeB 114 to guess the UL packet IAT at the UE 100 by processing the UL packets at the eNodeB 114. However, such estimations by the eNodeB 114 are generally not accurate because the packet IAT of the packets seen by the eNodeB 114 may be altered based on the grants that the eNodeB's UL scheduler provides to the various UEs within a cell. Thus, certain embodiments provide the UE assistance information 112 from the UE 100 to the eNodeB 114 including data associated with packet arrival.

It may be useful for the eNodeB 114 to know the types of applications currently running on the UE 100. For example, if the UE 100 determines a long packet IAT, the eNodeB 114 may put the UE 100 into idle mode or set a longer DRX cycle length to save power. If, however, the UE 100 measures a short packet IAT, the eNodeB 114 may set a shorter DRX cycle length.

Embodiments discussed below include using a single bit of packet IAT UE assistance information, using multiple bits of packet IAT UE assistance information, selectively reporting different formats of packet IAT, and selectively reporting packet IAT information or next packet arrival information.

A(1)—Single Bit Traffic Type or Packet IAT UE Assistance Information

In certain embodiments, the UE 100 is configured to communicate traffic type characteristics. The traffic type may relate to the packet IAT or other factors such whether an application is active or running in the background, or whether the screen saver of the UE is active because the user has not been interacting with the device. Thus, packet IAT is one of several ways available to the UE to determine whether UL traffic is background traffic or active traffic. For example, the UE 100 may perform packet IAT measurements for use in internal calculations or processing. If the measured packet IAT is relatively short (e.g., one or two seconds or less), then the UE 100 may determine that the UL traffic is active traffic. If, however, the measured packet IAT is relatively long (e.g., multiple seconds, tens of seconds, or minutes), then the UE 100 may determine that the UL traffic is background traffic. In addition, or in other embodiments, the UE 100 may know that current traffic is background traffic because there is not any active or open application running on the UE 100.

Figure 2A:
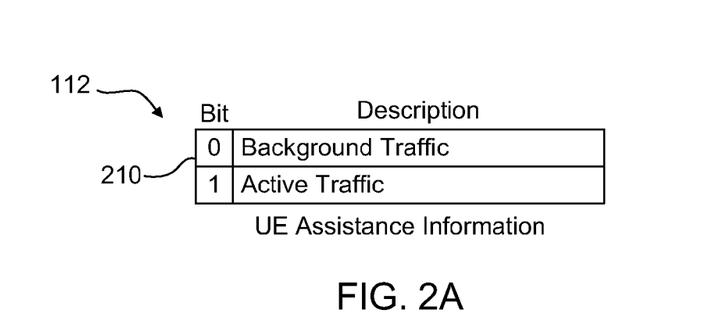
FIGS. 2A and 2B illustrate respective data structures of the UE assistance information with traffic type information according to certain embodiments.

FIG. 2A illustrates a data structure of the UE assistance information 112 with a single bit 210 of traffic type information according to one embodiment. In this example, the UE 100 sets the bit 210 to "0" to indicate that the current traffic is background traffic, and the UE 100 sets the bit 210 to "1" to indicate that the current traffic is active traffic.

A(2)—Multiple Bit Traffic Type or Packet IAT UE Assistance Information

In another embodiment, the UE 100 is configured to communicate traffic type information (e.g., determined using the packet IAT information or another method) to the eNodeB 114 using a plurality of bits of UE assistance information 112. Thus, the UE 100 may provide the traffic type with different levels of granularity, depending on the number of bits used.

Figure 2B:
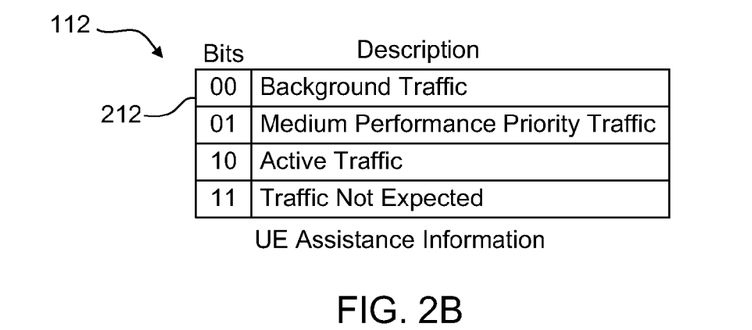

FIG. 2B illustrates a data structure of the UE assistance information 112 with two bits 212 of traffic type information according to one embodiment. In this example, the UE 100 sets the bits 212 to "00" to indicate a type of application with background traffic where the packet IAT is sparse and farther apart. Thus, the application has low application performance requirements (e.g., in terms of latency, jitter, and other parameters). The UE 100 sets the bits 212 to "01" to indicate that one or more applications are running that require medium performance priority traffic. This type of traffic may not be very periodic such as for hypertext transfer protocol (HTTP) web browsing or downloading. The UE 100 sets the bits 212 to "10" to indicate a type of application with active traffic with a high priority and tight latency and/or performance requirements. Examples of applications with very active traffic requirements include voice over internet protocol (VoIP) or online gaming applications. The UE 100 sets the bits 212 to "11" to indicate that traffic is not expected, which may be interpreted as a radio resource control (RRC) release indicator from the UE 100 to the eNodeB 114.

In other embodiments, the UE assistance information 112 may use three or more bits to increase the granularity of the traffic type information or the packet IAT information. For example, a plurality of bits may be used to communicate the actual packet IAT time (e.g., 10 seconds).

A(3)—Selectively Reporting Different Packet IAT Formats

In certain embodiments, the UE 100 is configured to selectively communicate packet IAT information using different formats or statistical representations. The selection may be based on, for example, the current type of traffic. Packet IAT may be different for each packet. Rather than sending a different packet IAT for each packet, some embodiments may represent more than one packet using a statistical form of the packet IATs over a particular period or for a specified event. For example, the packet IAT may be represented as a minimum IAT and a maximum IAT. As another example, the packet IAT may be represented by a mean IAT and a maximum IAT (e.g., with an understanding that the minimum IAT can be zero).

For certain applications, the traffic is bursty and/or infrequent. For example, a plurality or burst of packets may be transmitted every several seconds or so. An average IAT or mean IAT for bursty packet traffic does not provide sufficient information because it does not indicate how the packets arrive. A packet IAT for the duration of the burst of packets is referred to herein as a "short IAT" and a packet IAT for the duration between two consecutive bursts is referred to herein as a "long IAT." The short IAT may be very small, e.g., on the order of one or a few milliseconds. The long IAT may be very large, e.g., on the order of one or more seconds. In one embodiment, the UE 100 reports both the short IAT and the long IAT to the eNodeB 114 to accurately describe bursty traffic. The UE 100 may report average values of the short IAT and/or the long IAT.

Figure 3A:
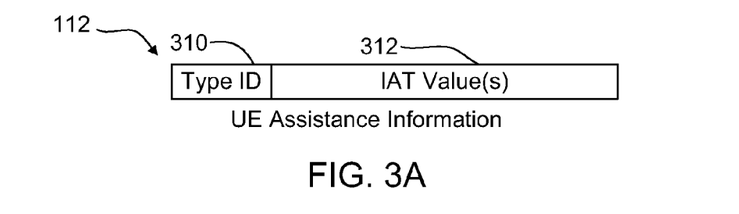
FIG. 3A illustrates a data structure of the UE assistance information with a type identifier and one or more inter-arrival time values according to one embodiment.
Figure 3B:
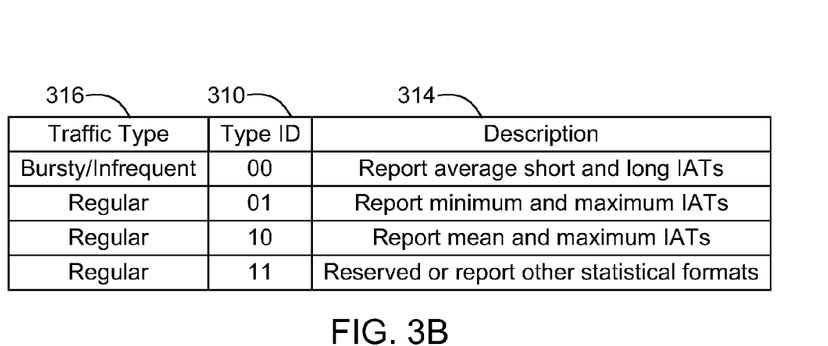
FIG. 3B illustrates example descriptions of the type identifier shown in FIG. 3A for different traffic types according to one embodiment.

FIG. 3A illustrates a data structure of the UE assistance information 112 with a type identifier (ID) 310 and one or more IAT values 312 according to one embodiment. The UE 100 knows the type of traffic and the format used to communicate the one or more IAT values 312 to the eNodeB 114. In order for the eNodeB 114 to correctly interpret the one or more IAT values 312, the type ID 310 specifies the format. FIG. 3B illustrates example descriptions 314 of the type ID 310 shown in FIG. 3A for different traffic types 316 according to one embodiment. As shown in FIG. 3B, the type ID 310 includes two bits. However, other embodiments may use a single bit or more than two bits. In this example, the UE 100 sets the type ID 310 to "00" when the traffic is bursty and/or infrequent to indicate that the reported IAT values 312 include average short and long IATs. For regular (e.g., not bursty) traffic, the UE 100 sets the type ID 310 to "01" to indicate that the reported IAT values 312 include minimum and maximum IATs, to "10" to indicate that the reported IAT values 312 include mean and maximum IATs, and to "11" to indicate that the reported IAT values 312 include other predetermined (e.g., known to both the UE 100 and the eNodeB 114) formats, which may include other statistical representations of the IAT over a predetermined period or for a predetermined event.

A(4)—Selectively Reporting IAT Vs. Next Packet Arrival Information

In certain embodiments, the UE 100 may selectively report next packet arrival information rather than a packet IAT value (e.g., average IAT or maximum IAT). The next packet arrival information may be a prediction by the UE 100 or may be based on information passed from an application via an application programming interface (API) to the device/media access control (MAC) layer. In some cases, information about very next packet arrival time can be more beneficial than the average or max IAT.

As discussed above, the packet IAT is a measure of the interval between two successively arriving packets or bursts or packets. The packet IAT is useful, for example, to decide if the current DRX configuration of the connected mode is appropriate or should it be adjusted. The next packet arrival time, on the other hand, corresponds to the interval between a current uplink transmission and a next arriving packet. The next packet arrival time is useful, for example, to decide if the UE 100 should be put in idle mode when no packets are expected in the near future, or whether the UE 100 should be kept in the connected mode when packets are expected soon.

Figure 4:
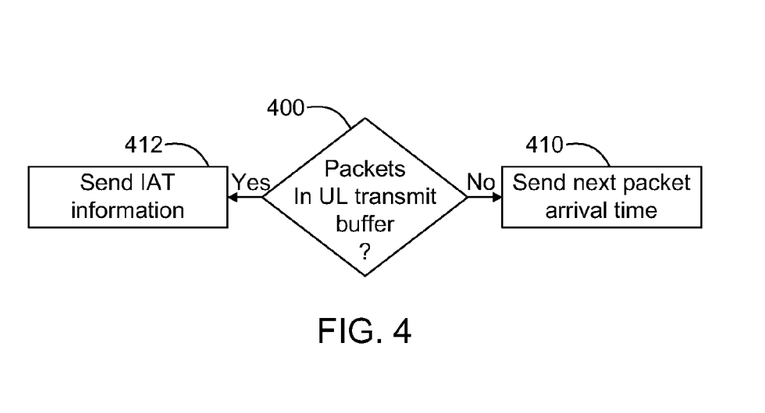
FIG. 4 is a flow chart for selectively reporting packet inter-arrival time or next packet arrival information according to one embodiment.

FIG. 4 is a flow chart for selectively reporting packet IAT or next packet arrival information according to one embodiment. In this example, the UE 100 queries 400 whether there are more packets in its UL transmit buffer. If there are no more packets in the UL transmit buffer, the UE 100 sends 410 the next packet arrival time so that the eNodeB 114 can decide whether the UE 100 should be put in idle mode or kept in connected mode. If, however, there are packets still in the UL transmit buffer, the UE 100 sends 412 the packet IAT information (e.g., as described above) so that the eNodeB can perform RAN functionality optimization such as deciding whether the DRX configuration of the connected mode is appropriate or whether the DRX configuration should be adjusted.

Some UEs may not have the capability to determine the packet IAT and/or to predict the next packet arrival time. Thus, in certain embodiments, the UE 100 is configured to indicate its capability of determining the packet IAT and predicting the next packet arrival time to eNodeB 114 (e.g., when establishing a connection with the eNodeB 114). This capability information may be communicated, for example, using a feature group indicator (FGI) bit. For example, one of the currently undefined FGI bits (bit numbers 37 to 64) such as bit number 38 can be used.

Figure 5A:
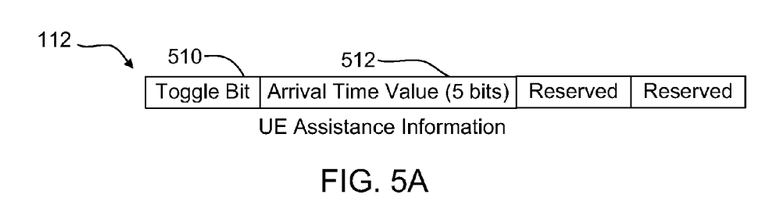
FIG. 5A illustrates a data structure of the UE assistance information with a toggle bit according to one embodiment.

FIG. 5A illustrates a data structure of the UE assistance information 112 with a toggle bit 510 for indicating whether an arrival time value 512 corresponds to packet IAT or next packet arrival time values according to one embodiment. The UE assistance information 112 in FIG. 5A may, for example, be communicated via a MAC control element (CE) that can be appended to the MAC protocol data unit (PDU). In one embodiment, one of the logical control identification (LCID) values (e.g., 01011-11000) for the uplink shared channel (UL-SCH) is used for the MAC CE. In this example, five bits are used to represent the arrival time value 512 and the remaining bits may be reserved for future use, as shown. In other embodiments, less than five bits or more than five bits may be used to represent the arrival time value 512.

As discussed below, other types of messages (e.g., RRC messages) may also be used to communicate the arrival time values and other types of UE assistance information. For example, UE specific IAT or next packet arrival information may be sent to the eNodeB 114 by including the information in one of the information elements (IEs) of the uplink dedicated control channel (UL-DCCH) messages. In one embodiment, an IE called "UE-IAT-NextPacketArrival" includes the IAT or next packet arrival information and may be included in the UEInformationResponse message used by the UE 100 to transfer information requested by the eNodeB 114. An example UE-IAT-NextPacketArrival message structure is shown below, which includes the options of short, long, and regular IATs:

```
UE-IAT-NextPacketArrival-r11 ::=  SEQUENCE {
    ue-IAT-NextPacketArrival-typeid    BIT STRING (SIZE (2)),
    ue-IAT-NextPacketArrival-Report    CHOICE {
    ue-IAT-NextPacketArrival-ShortLong    UE-IAT-NextPacketArrival-ShortLong,
    ue-IAT-NextPacketArrival-Regular      UE-IAT-NextPacketArrival-Regular
    }
}
```

-continued

```
UE-IAT_NextPacketArrival-ShortLong ::= CHOICE {
    next-packet-arrival-shortLong        SEQUENCE {
        short-NPA-mean                       BIT STRING (SIZE (3..N)),
        long-NPA-mean                        BIT STRING (SIZE (3..N))
    },
    ue-IAT-shortLong                     SEQUENCE {
        short-IAT-mean                       BIT STRING (SIZE (3..N)),
        long-IAT-mean }                      BIT STRING (SIZE (3..N))
    }
UE-IAT-NextPacketArrival-Regular ::=  CHOICE {
    next-packet-arrival-regular          SEQUENCE {
        min-mean-NPA                         CHOICE {
        min-NPA                                  BIT STRING (SIZE (3..N)),
        mean-NPA                                 BIT STRING (SIZE (3..N))
        },
        Max-NPA },                           BIT STRING (SIZE (3..N))
    },
    ue-IAT-regular                       SEQUENCE {
        min-mean-IAT                         CHOICE {
        min-IAT                                  BIT STRING (SIZE (3..N)),
        mean-IAT                                 BIT STRING (SIZE (3..N))
        },
        Max-IAT                              BIT STRING (SIZE (3..N))
    }
}
```

Figure 5B:
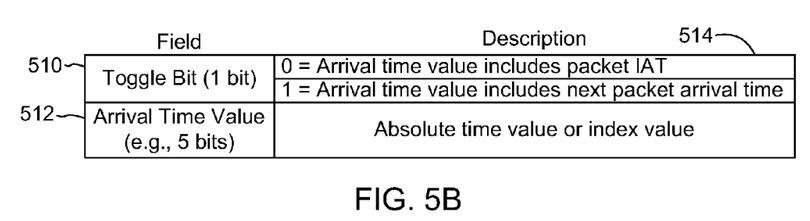
FIG. 5B illustrates example descriptions of the toggle bit shown in FIG. 5A according to certain embodiments.

FIG. 5B illustrates example descriptions 514 of the toggle bit 510 and arrival time value 512 shown in FIG. 5A according to certain embodiments. In this example, the UE 100 sets the toggle bit 510 to "0" to indicate that the arrival time value 512 includes packet IAT information and to "1" to indicate that the arrival time value 512 includes next packet arrival time information. As shown in FIG. 5B, the bits of the arrival time value 512 in one embodiment represent an absolute time value and in another embodiment represent an index value. The absolute time value may indicate, for example, 1 millisecond, 10 milliseconds, 100 milliseconds, 1 second, 10 seconds, or any other time value. Alternatively, the index value may correspond to a range of time values. With five bits, for example, the possible indexes range from "00000" to "11111." The indexes may be mapped to actual IAT values or value ranges. For example, an index of "00000" may be mapped to a range of 1 millisecond to 100 milliseconds, an index of "00001" may be mapped to a range of 101 milliseconds to 200 milliseconds, and so on.

B. Mobility State Indicator (MSI)

In one embodiment, the UE assistance information 112 includes an MSI of the UE 100. When the UE 100 is traveling between cells, the overhead or resources required for handover from a first eNodeB to a second eNodeB is greater if the UE 100 is in active mode than it is if the UE 100 is in idle mode. When the UE 100 is in the active mode, the first eNodeB communicates the information necessary for the handover to the second eNodeB. When the UE 100 is in idle mode, however, the information necessary for handover is not in the first eNodeB. Rather, the information in the idle mode is in a mobility management entity (MSE) of the evolved packet core. Thus, for example, communicating the MSI from to UE 100 to the eNodeB 114 reduces signaling overhead and system resources by allowing the eNodeB 114 to release the RRC connection and move the UE 100 to an RRC idle state when it is moving at high speed.

Figure 6:
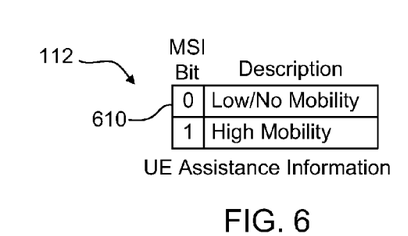
FIG. 6 illustrates a data structure of the UE assistance information including a mobility state indicator bit according to one embodiment.

FIG. 6 illustrates a data structure of the UE assistance information 112 including an MSI bit 610 according to one embodiment. In this example, the UE 100 sets the MSI bit 610 to "0" to indicate that the UE 100 has low mobility or no mobility, and the UE 100 sets the MSI bit 610 to "1" to indicate that the UE 100 has high mobility. Skilled persons will recognize from the disclosure herein that additional bits may be used for increased granularity (e.g., to indicate a high mobility state, a medium mobility state, a normal mobility state, and a low or no mobility state).

In one embodiment, the MSI bit 610 is preconfigured via signaling through open mobile alliance device management (OMA-DM) or an operator (e.g., for fixed-location or machine type communication (MTC) only devices). In another embodiment, the MSI bit 610 is updated based on signaling from a global navigation satellite system (GNSS) or other navigation system. In another embodiment, the MSI bit 610 is updated through MSE and the number of cell reselections or handovers performed during a predetermined period of time. For example, in an RRC idle state, the tracking may be done based on counting the number of cell reselections in a selected period. Whereas, in an RRC connected state, the tracking may be done based on counting the number of handovers in a selected period. Skilled persons will understand that one or multiple solutions can be used to identify the mobility state of the UE 100. The mapping of the mobility status information available in the UE 100 to the indicator (e.g., the MSI bit in FIG. 6) and transporting the MSI bit 610 as part of the UE assistance information 112 to the eNodeB 114 helps the eNodeB 114 to make faster and more accurate UE settings decisions, which in turn helps the UE 100 to save battery life.

C. Data and/or Traffic Type Characteristics

Figure 7:
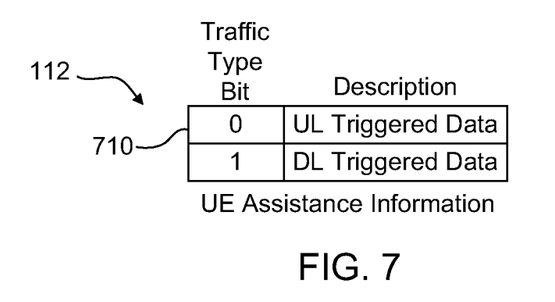
FIG. 7 illustrates a data structure of the UE assistance information including a traffic type bit according to one embodiment.

In one embodiment, the UE assistance information 112 includes data type characteristics and/or traffic type characteristic. An example of traffic type is the background or active traffic discussed above with respect to FIGS. 2A and 2B. As another example, the UE assistance information 112 may include an indication of whether traffic is mobile originated (MO) type traffic or mobile terminated (MT) type of traffic. MO and MT type traffic refers to whether the traffic is expected to be UL only, DL only, both UL and DL type traffic. FIG. 7 illustrates a data structure of the UE assistance information 112 including a traffic type bit 710 according to one embodiment. In this example, the UE 100 sets the traffic type bit 710 to "0" to indicate that the traffic is UL triggered data (e.g., a social networking application uploading text and/or photos), and the UE 100 sets the traffic type bit 710 to "1" to indicate that the traffic is DL triggered data (e.g., a web browser application downloading a web page). The eNodeB 114 may use the traffic type information to adjust its UL allocations and/or the DRX cycles based on the expected periodicity of the indicated traffic type.

Figure 8:
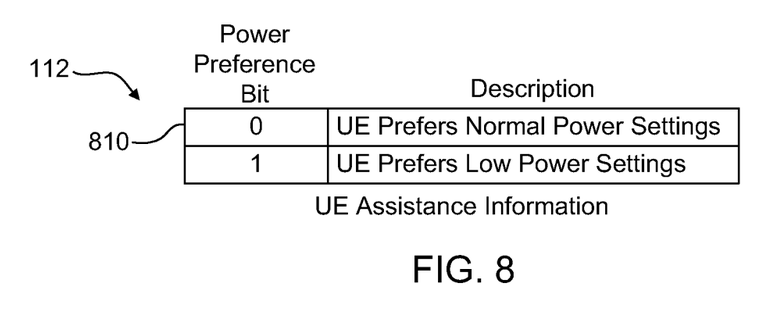
FIG. 8 illustrates a data structure of the UE assistance information including a power preference bit according to one embodiment.

In one embodiment, the data and/or traffic type may be in the form of a power preference indication. For example, the UE 100 may communicate a preference for normal power settings when processing active traffic and a preference for reduced or low power settings when processing background traffic. FIG. 8 illustrates a data structure of the UE assistance information 112 including a power preference bit 810 according to one embodiment. In this example, the UE 100 sets the power preference bit 810 to "0" to indicate a preference for normal power settings (e.g., in active mode) and the UE 100 sets the power preference bit 810 to "1" to indicate a preference for low power settings (e.g., in background mode). Based on the power preference bit 810, the eNodeB 114 can selectively adjust the UE's DRX configuration settings and other parameters. When the power preference bit 810 is set for low power settings (e.g., optimized power savings), for example, the eNodeB 114 may select a long DRX cycle or RRC connection release.

D. Time Alignment Timer (TAT) Feedback

In one embodiment, the UE assistance information 112 includes TAT feedback indicating a particular or desired value for the TAT. In LTE systems, the eNodeB 114 configures the TAT for each UE. The UEs use their TAT timers to maintain UL time alignment. When the TAT expires for a particular UE, the eNodeB 114 releases the UL control channels for that UE and the UE cannot provide UL transmissions until it performs a UL time alignment procedure.

In certain embodiments, the UE 100 is configured to provide feedback using the TAT timer to indicate to the eNodeB 114 to release its UL control channels. In one such embodiment, the UE 100 provides the feedback by requesting that the TAT value be set to a minimum value or by requesting another specific value (e.g., as the UE 100 might stay connected for a longer time but does not want to waste UL resource). In addition, or in other embodiments, the UE 100 may request that the TAT be set to a very high value to prevent the timer from expiring for a longer time such as during a longer DRX sleep period. A high TAT value may be useful, for example, where the UE 100 is expected to have low or no mobility (e.g., for certain MTC devices such as devices like smart meters or sensors).

II. Example Signaling of UE Assistance Information

The embodiments described below for communicating the UE assistance information from the UE 100 to the eNodeB 114 are provided by way of example. Skilled persons will recognize from the disclosure herein that many different types of messages, formats, or protocols may be used.

Figure 9:
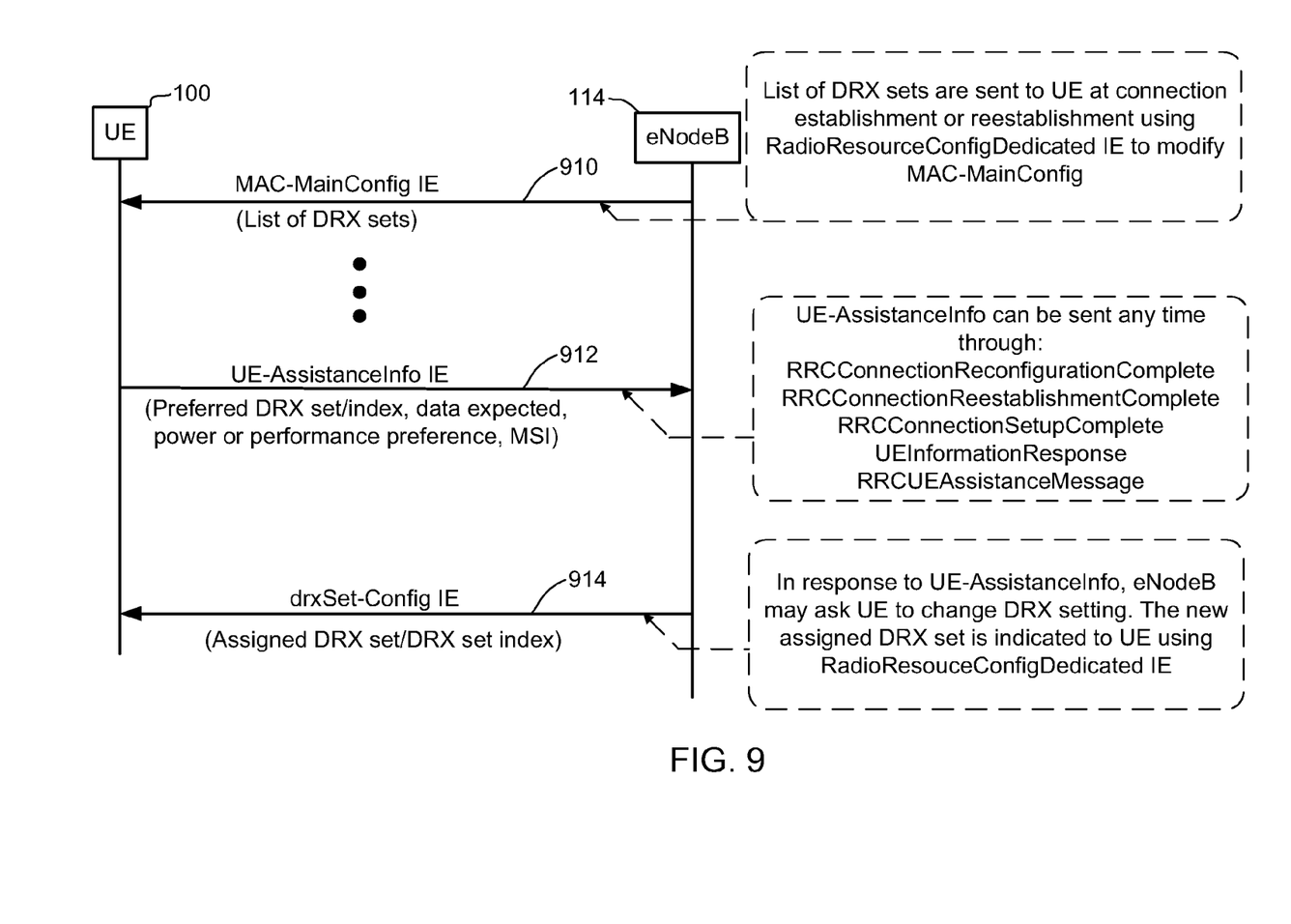
FIG. 9 illustrates communication of UE assistance information between a UE and an eNodeB according to certain example embodiments.

FIG. 9 illustrates communication between a UE 100 and an eNodeB 114 to assign a DRX set based on UE assistance information according to certain example embodiments. As discussed below, the communications shown in FIG. 9 include the eNodeB 114 sending a list of available DRX sets to the UE 100 using a MAC-MainConfig information element (IE) 910, the UE 100 sending UE assistance information to the eNodeB 114 in a UE-AssistanceInfo IE 912, and the eNodeB 114 sending an assigned DRX set (or index) to the UE 100 in a drxSet-Config IE 914.

The eNodeB 114 sends the list of DRX sets to the UE 100 at connection establishment or reestablishment using a RadioResourceConfigDedicated IE to modify the MAC-MainConfig IE 910. The eNodeB 114 may send the list of DRX sets at any time if, for example, the list changes. In one embodiment, the MAC-MainConfig IE 910 lists N number of DRX sets available at the eNodeB 114. To support multi-DRX switching, multiple sets of DRX sets (<=N) may be used. One or more of the DRX sets may be performance optimized such as for minimal end-to-end delay. Other DRX sets may, for example, be optimized for power savings. Another type DRX set may provide a balance between performance and power saving.

The MAC-MainConfig IE 910 may include a "drxset-index" parameter that identifies a specific DRX set available at the eNodeB 114. The drxset-index helps to reduce signaling overhead for multi-DRX embodiments because the eNodeB 114 can send the drxset-index (which may be a few bits depending on the value of N) rather than all of the DRX parameters related to that particular DRX set. In certain embodiments, however, the eNodeB 114 initially sends a list of all DRX sets available at the eNodeB 114 to the UE 100. The MAC-MainConfig IE 910 may also include an "assigned-DrxSetIndex" parameter that indicates to the UE 100 the DRX set number to be used for the first time after getting the list of DRX sets.

Referring again to FIG. 9, the UE-AssistanceInfo IE 912 may include, for example, a preferred DRX set or preferred DRX index, data expected, power or performance preferences, MSI, or other types of UE assistance information (e.g., background/active traffic, other traffic characteristics, TAT timer feedback, IAT, and/or next packet arrival time, as discussed above). In one embodiment, the UE-AssistanceInfo IE 912 sent from the UE 100 to the eNodeB 114 is included in the UL-DCCH. An example UL-DCCH message structure including the UE-AssistanceInfo IE 912 is provided as:

```
-- ASN1START
UL-DCCH-Message ::=     SEQUENCE {
    message                 UL-DCCH-MessageType
}
UL-DCCH-MessageType ::=  CHOICE {
    c1                       CHOICE {
        csfbParametersRequestCDMA2000       CSFBParametersRequestCDMA2000,
        measurementReport                   MeasurementReport,
        rrcConnectionReconfigurationComplete RRCConnectionReconfigurationComplete,
        rrcConnectionReestablishmentComplete RRCConnectionReestablishmentComplete,
        rrcConnectionSetupComplete          RRCConnectionSetupComplete,
        securityModeComplete                SecurityModeComplete,
        securityModeFailure                 SecurityModeFailure,
        ueCapabilityInformation             UECapabilityInformation,
        ulHandoverPreparationTransfer       ULHandoverPreparationTransfer,
        ulInformationTransfer               ULInformationTransfer,
        counterCheckResponse                CounterCheckResponse,
```

```
    ueInformationResponse-r9           UEInformationResponse-r9,
    proximityIndication-r9             ProximityIndication-r9,
    rnReconfigurationComplete-r10      RNReconfigurationComplete-r10,
    mbmsCountingResponse-r10           MBMSCountingResponse-r10,
    interFreqRSTDMeasurementIndication-r10   InterFreqRSTDMeasurementIndication-r10
},
later                    CHOICE {
  c2                                  CHOICE{
    rrcUEAssistanceMessage            RRCUEAssistanceMessage,
    spare15 NULL, spare14 NULL, spare13 NULL,
    spare12 NULL, spare11 NULL, spare10 NULL,
    spare9 NULL, spare8 NULL, spare7 NULL,
    spare6 NULL, spare5 NULL, spare4 NULL,
    spare3 NULL, spare2 NULL, spare1 NULL
  },
  messageClassExtension SEQUENCE { }
}
}
-- ASN1STOP
```

In other embodiments, the UE-AssistanceInfo IE 912 is defined as one of the noncritical extensions of existing IEs that can be carried by the UL-DCCH messages such as "RRCConnectionReconfigurationComplete," "RRCConnectionReestablishmentComplete," "rrcConnectionSetupComplete," and/or "ueInformationResponse," as shown in the example UL-DCCH message structure above. Such messages are generally sent in response to some eNodeB initiated RRC messages. Thus, the UE may not be able to send UE assistance information exactly when needed because it is waiting for one of these messages to be triggered. As shown in FIG. 9, certain embodiments of the UE-AssistanceInfo IE 912 include a new UL RRCUEAssistanceMessage for communicating UE assistance information transmission triggered by the UE. In such embodiments, the UE can send the UE assistance information to the eNodeB at any time.

For example, the RRCConnectionReconfigurationComplete message may include a "data-Expected" field to indicate that indicate that data is expected to arrive in the near future, a "power-Or-Performance-preferred" field to indicate the characteristics of a running application in terms a power savings preference or a performance preference, a "mobility-State-Indication" field to indicate mobility (e.g., in terms of the number of handovers or cell reselections per unit time), a "preferred-DrxSet" field to indicate a specific set of DRX settings requested by the UE 100 to optimize its performance, a "preferred-Drxset-Index" field with an index value corresponding to a DRX set that the UE 100 wants to configure in the future, combinations of the foregoing, and/or other fields to communicate the UE assistance information disclosed herein.

By way of example, a UE assistance parameter called "powerPreference-Indication" may be used to indicate whether the UE 100 supports power preference indication (discussed above) and an RRCConnectionReconfiguration message may include a "powerPrefIndicationConfig" IE that is used to provide information related to the UE's power saving preference. The powerPrefIndicationConfig IE includes a "PowerPrefIndication" field that may be set to a "lowpowerconsumption" state to indicate that the UE 100 prefers a configuration that is primarily optimized for power savings. Otherwise, the UE 100 sets the PowerPrefIndication field to a "normal" state.

In one embodiment, a UE capable of providing power preference indications may initiate the procedure of communicating its power preference in several different situations including upon being configured to provide power preference indications and upon change of power preference. Upon initiating the procedure, the UE 100 determines whether it transmitted a power preference indication since it was configured to provide power preference indications. If it did not, then the UE 100 initiates transmission of the UEAssistanceInformation message. If the UE 100 has already transmitted a power preference indication, it determines whether its current power preference information is different from the one indicated in the last transmission of the UEAssistanceInformation message. If the current power preference is different, and a power preference indication timer has expired, the UE 100 initiates transmission of the UEAssistanceInformation message with the current information. Also, if the UE 100 had sent an updated power preference indication to a source cell just prior to handover, then after handover has completed the UE 100 initiates transmission of the UEAssistanceInformation message with the current information.

An example UEAssistanceInformation message structure including the PowerPrefIndication field is provided as:

```
-- ASN1START
UEAssistanceInformation ::=       SEQUENCE {
  criticalExtensions         CHOICE {
    c1                              CHOICE{
      ueAssistanceInformation-r11   UEAssistanceInformation-
                                       r11-IEs,
      spare7 NULL,
      spare6 NULL, spare5 NULL, spare4 NULL,
      spare3 NULL, spare2 NULL, spare1 NULL
    },
    criticalExtensionsFuture        SEQUENCE { }
  }
}
UEAssistanceInformation-r11-IEs ::=  SEQUENCE {
  powerPrefIndication-r11   PowerPrefIndication-r11   OPTIONAL,
  nonCriticalExtension    SEQUENCE { }        OPTIONAL
}
-- ASN1STOP
```

In response to the UE-AssistanceInfo IE 912, the eNodeB 114 may take one or more actions or may decide to take no action. For example, the eNodeB may respond by releasing the UE 100 (e.g., making it go into idle mode). As shown in FIG. 9, the eNodeB 114 may also respond to the UE-AssistanceInfo IE 912 by sending a drxSet-Config IE 914 to the UE 100 with a request to change the DRX setting. The drxSet-Config IE 914 may include a newly assigned DRX set or DRX set index. In one embodiment, the drxSet-Config IE 914 is an extension of the RadioResourceConfigDedicated IE. The MAC main configuration information is transmitted from the eNodeB 114 to the UE 100 using RadioResourceConfigDedicated. The RadioResourceConfigDedicated IE is used to setup, modify, and release radio bearers (RBs), to modify the MAC main configuration, to modify the semi-persistent scheduling (SPS) configuration, and to modify the dedicated physical configuration. In certain embodiments, the RadioResourceConfigDedicated IE is modified to include a new element referred to herein as "drxSet-Config" IE that can also be used to modify the DRX configuration.

Figure 10:
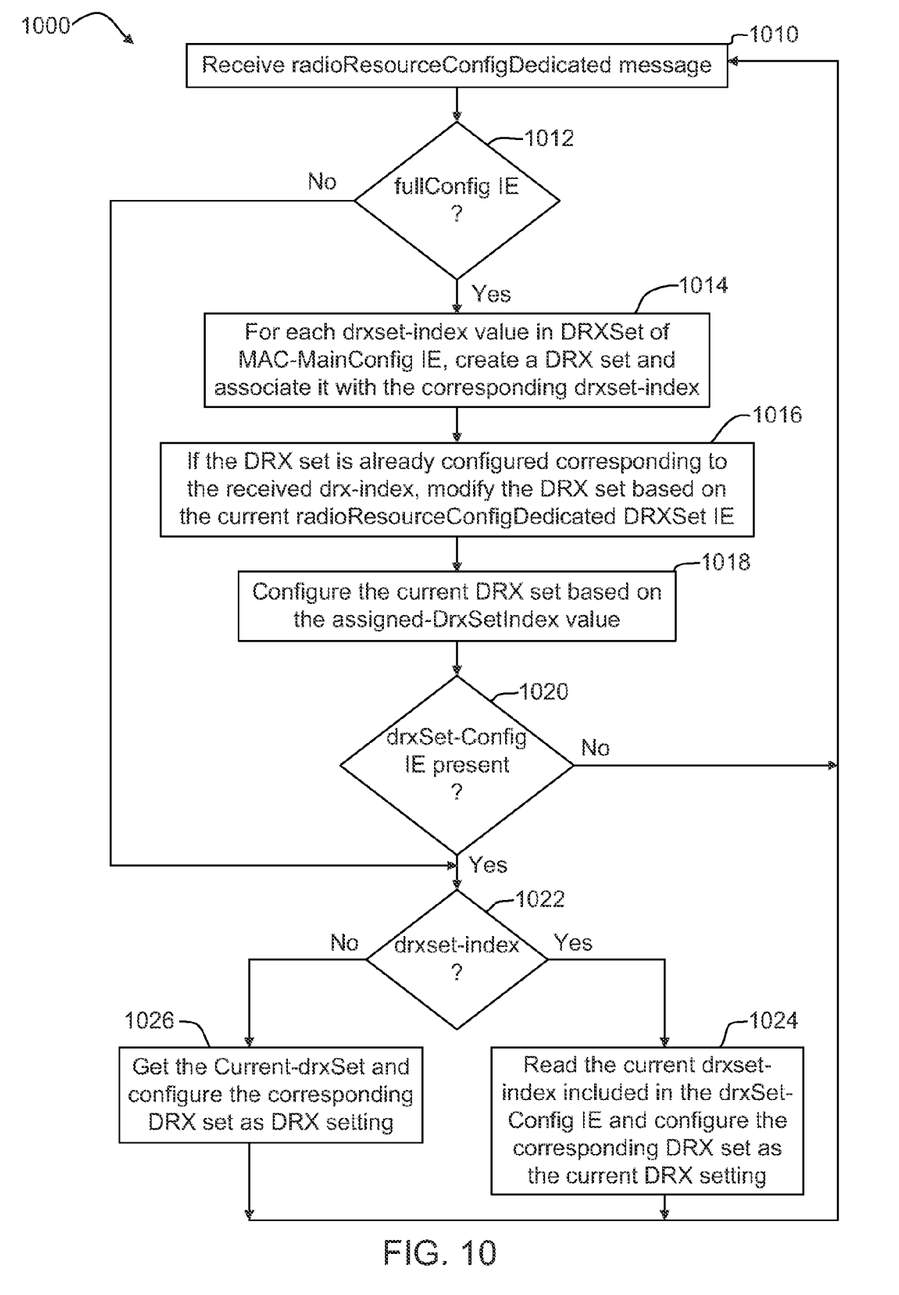
FIG. 10 is a flow chart of a method for selecting or modifying a set of discontinuous reception parameters according to one embodiment.

FIG. 10 is a flow chart of a method 1000 for selecting or modifying a DRX set according to one embodiment. The method 1000 includes receiving 1010 a radioResourceConfigDedicated message at the UE 100. Initially, the UE 100 queries 1012 whether the RRCConnectionReconfiguration message includes a fullConfig IE. If it does include a fullConfig IE, the UE 100 performs the DRX sets update from the MAC-MainConfig IE. For each drxset-index value in the DRXSet (which is a list of DRX sets available at the eNodeB 114), the UE 100 creates 1014 a DRX set and associates it with the corresponding drxset-index. If the DRX set is already configured corresponding to the received drx-index, the UE 100 modifies 1016 the DRX set based on the current radioResourceConfigDedicated DRXSet IE. The UE 100 then configures 1018 the current DRX set based on the assigned-DrxSetIndex value.

The UE 100 may query 1020 whether the drxSet-Config IE is present in the radioResourceConfigDedicated message When the fullConfig IE is present in the RRCConnectionReconfiguration message, the radioResourceConfigDedicated message usually does not include the drxSet-Config IE. If the drxSet-Config IE is present, however, the UE 100 queries 1022 whether the drxset-index is present in the message. If the drxset-index is present, the UE 100 reads 1024 the current drxset-index included in the drxSet-Config IE and configures the corresponding DRX set as the current DRX setting to use, until further change. If, however the drxset-index is not present, the UE 100 gets 1026 the Current-drxSet and configures the corresponding DRX set as the DRX setting to use, until further change.

If the RRCConnectionReconfiguration message does not include a fullConfig IE, then the UE 100 does not perform the DRX sets update from the MAC-MainConfig IE. Rather, after receiving a new radioResourceConfigDedicated message, the UE 100 queries 1022 whether the drxset-index is present in the message. If the drxset-index is present, the UE 100 reads 1024 the current drxset-index included in the drxSet-Config IE and configures the corresponding DRX set as the current DRX setting to use, until further change. If, however the drxset-index is not present, the UE 100 gets 1026 the Current-drxSet and configures the corresponding DRX set as the DRX setting to use, until further change.

III. Example Mobile Device

Figure 11:
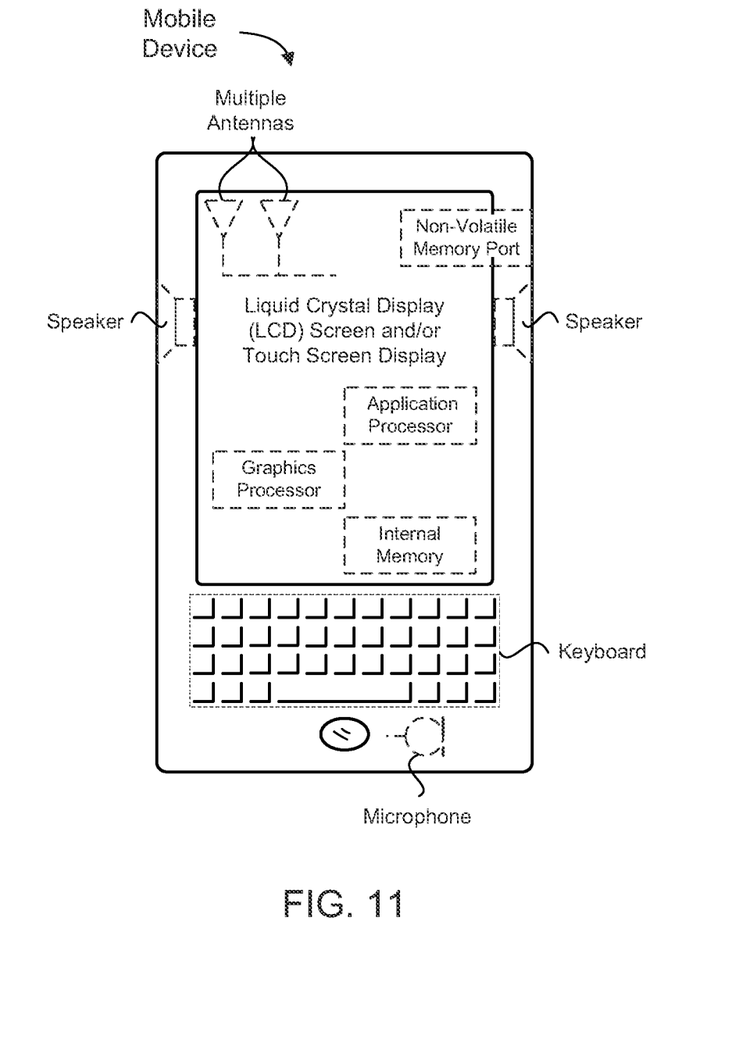
FIG. 11 provides an example illustration of the mobile device that may be used with one or more of the embodiments disclosed herein.

FIG. 11 provides an example illustration of the mobile device that may be used with one or more of the embodiments disclosed herein. The mobile device may be, for example, a UE, a mobile station (MS), a mobile wireless device, a mobile communication device, a tablet, a handset, or other type of mobile wireless device. The mobile device can include one or more antennas configured to communicate with base station, such as a an eNodeB, a base band unit (BBU), a remote radio head (RRH), a remote radio equipment (RRE), a relay station (RS), a radio equipment (RE), or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 11 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implements as one or more modules, which is a term used to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. A processing module, comprising:
   circuitry to:
   configure a user equipment (UE) to provide power saving preference indications to a wireless communication network;
   after completion of the configuration of the UE to provide the power saving preference indications, or upon a change in a power saving preference of the UE, initiate transmission of a UE assistance information message to the wireless communication network;
   wherein to initiate the transmission, the circuitry is further configured to:
   generate the UE assistance information message including a single bit comprising an indication of the power saving preference; and
   provide the UE assistance information message for transmission to the wireless communication network; and
   wherein the circuitry is further configured to:
   determine that the UE sent the UE assistance information message to a first cell of the wireless communication network within a predetermined time period before a handover of the UE from the first cell to a second cell of the wireless communication network; and
   in response to the determination and after completion of the handover of the UE from the first cell to the second cell, initiate transmission of the UE assistance information message to the second cell.

2. The processing module of claim 1, wherein the circuitry is configured to:
   detect the change in the power saving preference of the UE by a determination that a current power saving preference of the UE is different than a previous power saving preference transmitted by the UE to the wireless communication system;
   in response to the detected change in the power saving preference of the UE, determine that a power saving preference indication timer has expired; and
   in response to the detected change in the power saving preference of the UE and in response to the determination that the power saving preference indication timer has expired, initiate the transmission of the UE assistance information message to the wireless network.

3. The processing module of claim 2, wherein the circuitry is further configured to:
   determine that the UE does not prefer a power saving configuration; and
   in response to the determination:
   start or restart the power saving preference indication timer; and
   set a power saving preference indication parameter of the UE assistance information message to a power consumption setting that indicates that the UE does not prefer the power saving configuration.

4. The processing module of claim 1, wherein the circuitry is further configured to:
   determine that the UE prefers a power saving configuration; and
   in response to the determination, set a power saving preference indication parameter of the UE assistance information message to a low power consumption setting.

* * * * *